US009664930B2

(12) United States Patent
Soto Bustamante et al.

(10) Patent No.: US 9,664,930 B2
(45) Date of Patent: May 30, 2017

(54) IN SITU POLYMERISATION PROCESS FOR OBTAINING AN ELECTRO-OPTICAL APPARATUS, SAID POLYMER AND ELECTRO-OPTICAL APPARATUS; AND USES THEREOF

(75) Inventors: Eduardo Arturo Soto Bustamante, Independencia Santiago (CL); Victor Hugo Trujillo Rojo, Independencia Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 572 days.

(21) Appl. No.: 13/982,522

(22) PCT Filed: Jan. 30, 2012

(86) PCT No.: PCT/CL2012/000002
§ 371 (c)(1),
(2), (4) Date: Sep. 9, 2013

(87) PCT Pub. No.: WO2012/103663
PCT Pub. Date: Aug. 9, 2012

(65) Prior Publication Data
US 2014/0002783 A1 Jan. 2, 2014

(30) Foreign Application Priority Data
Jan. 31, 2011 (CL) .................................. 198-2011

(51) Int. Cl.
*C25B 3/00* (2006.01)
*G02F 1/00* (2006.01)
(Continued)

(52) U.S. Cl.
CPC ......... *G02F 1/0018* (2013.01); *G02B 5/3016* (2013.01); *G02F 1/133365* (2013.01)

(58) Field of Classification Search
CPC ....................................................... C25B 3/00
(Continued)

(56) References Cited

U.S. PATENT DOCUMENTS 5,833,833 A * 11/1998 Dultz .................. H01L 37/02
205/414
2006/0215077 A1* 9/2006 Majumdar ............ B82Y 10/00
349/88
2010/0272925 A1 10/2010 Goetz et al.

FOREIGN PATENT DOCUMENTS

JP       3 216998 A      9/1991
JP     2001125146 A *    5/2001 ............. G02F 1/141

OTHER PUBLICATIONS

Rubin et al., "Effect of Mesophase Order and Molecular Weight on the Dynamics of Nematic and Smectic Side-Group Liquid Crystalline Polymers," Macromolecules (no month, 1995), vol. 28, pp. 3521-3530.*

(Continued)

*Primary Examiner* — Enda Wong
(74) *Attorney, Agent, or Firm* — Ladas & Parry LLP (57) ABSTRACT

The invention provides an In situ polymerization process which does not require the use of polymerization initiators or solvents for obtaining an electro-optical apparatus wherein a compound having a polymerizable group, preferably an acrylate or methacrylate, is introduced into a cell formed of 1 to 100 microns thick, wherein said compound having a polymerizable group is maintained at a temperature which is above its melting temperature, and a direct current electric field is applied of at least 2.5 V/μm and for a time ranging between 5 minutes and 24 hours until the polymerization of the compound with the polymerizable group is achieved, an then cooled down to room temperature and removing the applied field. Also the polymer that is obtained from the in situ polymerization is provided, as well as the (Continued)

electro-optical apparatus containing the polymer which is obtained after the in situ polymerization process and the use of the electro-optic apparatus wherein the apparatus works as a polarizer, as a pixel in a liquid crystal display and as a ferroelectric, magnetic, piezoelectric or pyroelectric sensor.

15 Claims, 5 Drawing Sheets

(51) Int. Cl.
*G02B 5/30* (2006.01)
*G02F 1/1333* (2006.01)

(58) Field of Classification Search
USPC .................................. 205/355, 414
See application file for complete search history.

(56) References Cited

OTHER PUBLICATIONS

Kurihara S et al: "Preparation and structure of polymer networks by polymerization of liquid crystalline monomers in DC electric field", Polymer, Elsevier Science Publi Shers B.V, GB, vol. 39, No. 15, Jul. 1, 1998 (Jul. 1, 1998), pp. 3565-3569, XP004122273, ISSN: 0032-3861, DOI: 10.1016/S0032-3861(97)10268-3 the whole document.

* cited by examiner

IN SITU POLYMERISATION PROCESS FOR OBTAINING AN ELECTRO-OPTICAL APPARATUS, SAID POLYMER AND ELECTRO-OPTICAL APPARATUS; AND USES THEREOF

RELATED APPLICATION INFORMATION

This application is a 371 of International Application PCT/CL2012/000002 filed 30 Jan. 2012 entitled "In Situ Polymerisation Process For Obtaining An Electro-Optical Apparatus, Said Polymer And Electro-Optical Apparatus; And Uses Thereof", which was published on 9 Aug. 2012, with International Publication Number WO 2012/103663 A1, and which claims priority from Chilean Patent Application No. 198-2011 filed 31 Jan. 2011, the contents of which are incorporated herein by reference.

FIELD OF THE INVENTION

This invention aims to solve the formation of macromolecules which do not require the use of polymerization initiators or solvents or in the case where the use of them is restricted or prohibited. The present invention relates to the design and production of optical components, using preferably but not limited to, liquid crystals, which form highly oriented polymer components, useful as polarizing elements in a pixel to be used preferably but not limited to, the industry of liquid crystal displays.

BACKGROUND OF THE INVENTION

Processes which allow a pure substance to polymerize are well known in the state of the art. Initiators capable of generating free radicals, either by thermal decomposition or photo-induced, is a typical way of initiating polymerization. The process may also be induced via cationic polymerization, which takes place in acidic solution, or using Ziegler-Natta catalysts which not only induce polymerization but also accommodate the monomer units in preferred positions thus generating stereoregularity in polymer chain such as tacticity. Among the polymerization in solution, the electrochemical polymerization is a well-known procedure, which considers the application of an electric potential in monomers of a preferred structure such as pyrrole and various anilines, soluble in the solvents to be used, but using salt solutions acting as a supporting electrolyte.

There are not many examples of technologies related to the production of polymers using an electric field without initiators or electrolyte solutions. Some patents described relief made on a surface by using complex systems of multifunctional monomers which also possess good adhesion. The first patent related to the application of an electric field on a mixture of monomers was issued on 1941 (W. Luster, U.S. Pat. No. 2,257,177). This process is performed under reduced pressure (0.001 and 100 mm Hg, preferably 10 to 40 mm Hg), and differs of voltolisation (described below) as the author explain, because they consider conducting a chemical reaction by applying an electric shock of high frequency, at least 1 megacycle and up to 600 megacycles per second. In voltolisation, frequencies below 10,000 cycles are used. Thus, W. Luster indicates that it is possible to polymerize, dehydrogenate or perform addition reactions using an electric field.

Patent GB1205438 (16 Sep. 1970) of Xerox is probably the most general of all, because it describes a polymerization between electrodes (again in a multi-functional monomers mixture) in the absence of chemical initiators, catalysts and electrolytes, only by applying an electric field. This polymerization process is considered as charge injection polymerization. However, the examples are related to complex multifunctional systems which generate highly cross-linked systems with good adhesion in plates for printing or for producing relief images of Braille type. This work is similar to later inventions described in U.S. Pat. No. 3,879,275 (Apr. 22, 1975), U.S. Pat. No. 3,862,841 (Jan. 28, 1975) and U.S. Pat. No. 3,965,276 (Jun. 22, 1976).

Under the C08F2/52 classification, according to International Patent Classification IPC, polymerization processes by electric discharge or voltolisation are described. It is interesting to notice that under this classification some documents described the so-called electro-polymerization processes. However, going into the content of such documents, it is evident that such processes correspond to electrochemical polymerization, being the corresponding independent claim for the process not clear to specify this type of polymerization, (see e.g. U.S. patent 2010048815 or WO2008039151). The documents described under this classification can be grouped into sub-categories. The plasma polymerization, where monomer is in the gaseous state and the polymerization is initiated at the plasma; plasma polymerization using a photo-initiator; a monomer grafted into a polymer, activated by gamma radiation, X-ray, etc; radio-polymerization by corona discharge or ion beam, used mostly for the formation of conducting polymers, and so on.

Summarizing, none of these technologies has been applied in isolated monofunctional molecules in the isotropic state or in a mesophase, under normal conditions of pressure and DC fields. The two major types of inventions are first originated early in the preparation of crosslinked films for relief, where mixtures of polyfunctional monomers were used. The second, which is most currently in uses, refers to polymerization in plasma, corona discharge or charge injection, but in gas or plasma state.

In the field of liquid crystals (LC), various types of technologies requiring the preparation of polymers mixed with LC possess attractive features for use in electro-optics, such as polymer-dispersed LC (PDLC) as described in US2006187402, WO2006061808, US2006119917, WO0150200, JP11223810, KR100257886, among others; polymer stabilized LC (PSLC) as in JP2005331757, CN1811528, U.S. Pat. No. 6,215,543, U.S. Pat. No. 5,504,600 and U.S. Pat. No. 6,075,583, WO2010032962 among others. All these documents take into account the preparation of the polymer both using mostly photo-initiators, or free radicals initiators, and in rare cases initiated as thermal polymerization.

For LC technology, the general purpose when using an electric field is to produce a better alignment of liquid crystal system, as described in CA2470493, US2006256258, JP2002031821.

In the development of liquid crystal displays (LCD) a preferential alignment of the LC to be used as optical switch is required. Actual technology achieve homogeneous alignment using thin layers of i.e. polyamide, as a few layers on the electrodes, on which grooves are induced by mechanical processes and also using photo-aligned polymers capable to be photo-isomerized. In these grooves the LC molecules are arranged so as to obtain a pre-ordering required in the pixel. In order to obtain homeotropic alignment substrates coated with hydrophobic films such as silane compounds are required (Alignment Technologies and Applications of Liquid Crystal Devices, Kohki Takatoh et. al., 2005, Tayor & Francis, ISBN 0-748-40902-5). With this technology it is possible to obtain planar alignment and also homeotropic alignment, depending on the desired end goal. A pixel is known as the smallest homogeneous surface which comprises an image and that is defined by its brightness and color.

In the document WO 2008/145297, a liquid crystal mixture composed of materials with negative dielectric anisotropy for use in vertical alignment technology (VA) stabilized by a polymer (PS-VA) is described. The principle of electrically controlled birefringence known as ECB was first described in 1971 (M F Schieckel and K. Fahrenschon, "Deformation of nematic liquid crystals with vertical orientation in electric fields", Appl. Phys Lett. 19. (1971), 3912), followed by the works of J F Kahn (Appl. Phys Lett. 20. (1972), 1193) and G. Labrunie (J. Appl. Phys. 44 (1973), 4869). For a mixture to be used in LCDs based on the ECB effect, the liquid crystalline phase should have high ratio of elastic constant values K1/K3, high optical anisotropy $\Delta n$ and a dielectric anisotropy $\Delta \in$ values ranging between −0.5 and −5. J. Robert and F. Clerc (SID 80 Techn. Papers, 1980, 30), J. Duchene (Displays 7, 1986, 3) and H. Schad (SID 82 Digest Techn. Papers, 1982, 244). The electro-optical elements based on the ECB effect must possess homeotropic alignment. The patent WO 2008/145297 refers to a crystalline liquid medium based on a mixture of polar compounds with dielectric anisotropy ($\Delta \in$) negative in order to be used in vertical alignment technology (VA).

Mixtures of liquid crystal phases mostly with nematic, used in PS-VA, such as those described in WO 2008/145297 mentioned above, are currently the market leading technology for the development of high quality displays. Here the homeotropic orientation of the mesophase is used in the electro-optical element. They replace the conventional technology of vertical alignment (VA) developed before by the industry of flat displays. This new technology is based on the formation of polymer networks or polymer layers within the pixel where the molecules with negative dielectric anisotropy can turn against an applied field switching on and off the light. The local tilt predefines the change in direction of liquid crystal, resulting in very fast switching times, one of the relevant parameters today for the development of liquid crystal flat panel displays. The development of such systems showing higher efficiency allows for better image quality in motion, lower switching times, higher contrast and better light transmission, which also implies a decrease in the required power backlight.

Typically the manufactures of displays which use PS-VA technology necessarily require the use of radical initiators in polymerization as photo initiators and hence also the use of polarized UV light to form the networks of polymers.

The ferroelectric liquid crystals (FLC) are potential candidates to improve the existing technology of flat panel displays, as they present response times up to 500,000 times faster than currently used systems based on nematic mesophases. Clark and Lagerwall in the document EP0032362 describe an electro-optical apparatus where a FLC is included into a cell or pixel, and due to surface stabilization, a switching occurs (SSFLC). However, the problems of defects in the formed mesophase and others issues as the mesophase stabilization, do not allow the use of this technology in large screens, problems apparently already partially solved. These FLC systems are still conditioned to the cell thicknesses which must be comparable to the material pitch, which usually does not exceed 2 microns.

The PS-FLC mode for displays considers the preparation of a network similar to that for PS-VA in nematics, but now applied to smectic-induced mixtures with planar orientation, where the FLC has a V-shaped switching (S. Kawamoto, et. Al., Displays, 25, 1, 2004, 45-47). The authors suggest that this technology can also be developed in both, smectic A and smectic C phase in the presence of an FLC material. Here again, the polymerization is conducted using a photo-initiator which forms the polymer network, where the amount of polymerizable material is 6% on the total mixture.

In summary, there are different procedures for carrying out polymerization processes, being one more effective than others, all achieving the same objective which is to cure the polymer.

However, still remains a need to carry out polymerization processes which enable the same or better results but which can be easier to be implemented and more effective than the existing ones.

The present invention proposes a new technology based on liquid crystals, which considers the use of electric field to promote in situ polymerization and thus getting highly ordered systems where guest molecules can introduce new properties into the matrix which is formed. This implies a major advantage over the prior art, since it does synergistically align a molecule while simultaneously, an in situ polymerization induced by the field is performed. As already discussed, both, for display's development, optical switches or polarizer, the electric field has been always used only for molecular orientation, but never to build the polymer matrix.

Attended the above, is an objective of the present invention to produce polymers without the use of polymerization initiators as photo- or radical initiators and without the use of solvents. Preferably, the compound to be polymerized possesses liquid crystal properties, so the reaction can be performed either in one of the mesophases or at the isotropic state.

It is another object of the invention that the so formed polymer imparts a preferential ordering, thus allowing to produce the alignment of the liquid crystal or the rest of the components of a selected mixture.

Another objective of the present invention is that due to the order achieved in the polymer matrix its physical properties may be changed by the proper selection of the second component in the mixture, where the physical properties can be so different as ferroelectric, magnetic, fluorescent or nonlinear optical, to name a few.

One of the preferred embodiments of the invention is the construction of a pixel or polarizer to switch light obtained by in situ polymerization of one or more polymerizable compound by the process described below, where between the electrodes a single polymeric material and between 0 and 90% of a second organic or inorganic component, or a mixture of components, which previously haven't undergone any decomposition or structural changes within the cell by any pretreatment.

Finally, it is an object of the invention that the preferably uses given to the device should be as an electro-optic switch, or polarizer or a pixel in a liquid crystal display.

SUMMARY OF THE INVENTION

The present invention relates to an in situ dry electropolymerization, which involves the application of direct current voltages which can induce the coupling of monomer units, preferably but not limited to, acrylates or methacrylates or mixtures thereof for the formation of macromolecules. It is considered, without being a limitation, the use of cells with thicknesses up to 100 microns. The applied field has a magnitude of at least 2.5 V/µm. In case of aligned systems, a treatment of the electrode's surfaces is required using polymer layers, usually but not limited to, polyimides with anchoring grooves for the preferential orientation of the monomer to be polymerized in where such orientation is either planar or homeotropic.

Having clear that is possible to achieve a preferential orientation of the molecules with the help of alignment layers, which are commonly used in the state of the art, and that this alignment can be either planar or homeotropic, it is possible to construct an electro-optic device or pixel, where for the case where the polymerizable compounds are forming a mixture of compounds in a nematic mesophase and with a negative dielectric anisotropy, it is possible to construct a light polarizer element which behaves as the typical devices used in PS-VA.

If we also include a chiral liquid crystal able to build a tilted smectic C phase and which is non-polymerizable, we can get a pixel for a viewing device, due to the fact that is possible to form a polarizer with the generated polymer matrix. Therefore, with this new polymerization process, we introduce a new methodology for obtaining light polarizing sheets or pixels for display devices.

This new system forms an inert liquid crystalline polymer where for instance, the ferroelectric liquid crystalline (FLC) material interacts with the matrix. Due to the alignment of the monomer prior to the application of electric field, it is possible to achieve a substantial improvement in alignment and stability of the polymer-FLC system constructed.

The degree of alignment of the resulting polymer depends on the phase in which electric field has been applied, the application time and the structure of the starting polymerizable compound with liquid crystalline properties.

The invention further comprises a polymer obtained in situ from a compound having a polymerizable group preferably acrylate or methacrylate type and which has no residues of polymerization initiators.

Additionally, the invention comprises obtaining an electro-optical device which consists of two glass surfaces separated by a material which acts as spacer from 1 to 100 microns, which has on each of their inner surfaces a thin layer of a material working as an electrode on one side and as a counter electrode on the other side respectively, with a second thin layer attached to either the electrode or the counter-electrode or both of a polymer treated to produce the liquid crystal alignment, and possessing at the free space between the faces and the spacer, a liquid crystal or a mixture of them subjected to the electro-polymerization process as described herein.

DETAILED DESCRIPTION OF THE INVENTION

In this work we describe a new method for in situ polymerization of a single compound with at least one polymerizable group, like acrylate, methacrylate or its derivatives and which does not need radical initiators or electromagnetic radiation to start the polymerization reaction. Neither requires an electrolytic solution as in the well-known electrochemical polymerization. We refer to the dry electro-polymerization, which involves the application of direct current voltages which can induce coupling of monomer units in situ, preferably but not limited to, acrylates or methacrylates or mixtures thereof for the formation of macromolecules. It is considered, without being a limitation, the use of cells with thicknesses up to 100 microns. The applied field has a magnitude of at least 2.5 V/μm. In case of aligned systems, a treatment of the electrode's surfaces is required using polymer layers, usually but not limited to, polyimides with anchoring grooves for the preferential orientation of the monomer to be polymerized in where such orientation is either planar or homeotropic.

If we consider including with the acrylate or methacrylate like polymerizable compounds, a liquid crystal mixture which has a nematic phase with a negative dielectric anisotropy, we obtain a suitable pixel for use in PS-VA systems, in where due to the preferential homeotropic alignment which imparts the cell, the system remains with molecules preferably homeotropically aligned and stabilized by the polymer network formed with the described method.

By including a non polymerizable chiral liquid crystal possessing a smectic C phase we obtain other pixel for a viewing device, due to the fact that it is possible to form a polarizer with the polymer matrix which is generated. Therefore, with this new in situ polymerization process, we introduce a new methodology for obtaining light polarizing sheets or pixels for display devices.

In our system we build an inert liquid crystalline polymer in which for example, the ferroelectric liquid crystalline material (FLC) interacts with the matrix. Due to the alignment of the monomer prior to the application of the electric field, it is possible to achieve a substantial improvement in alignment and stability of the formed polymer-FLC.

The degree of alignment of the resulting polymer depends on the phase in which it has been applied an electric field, the application time of the field and the structure of the starting polymerizable compound with liquid crystalline properties.

Figure 1:
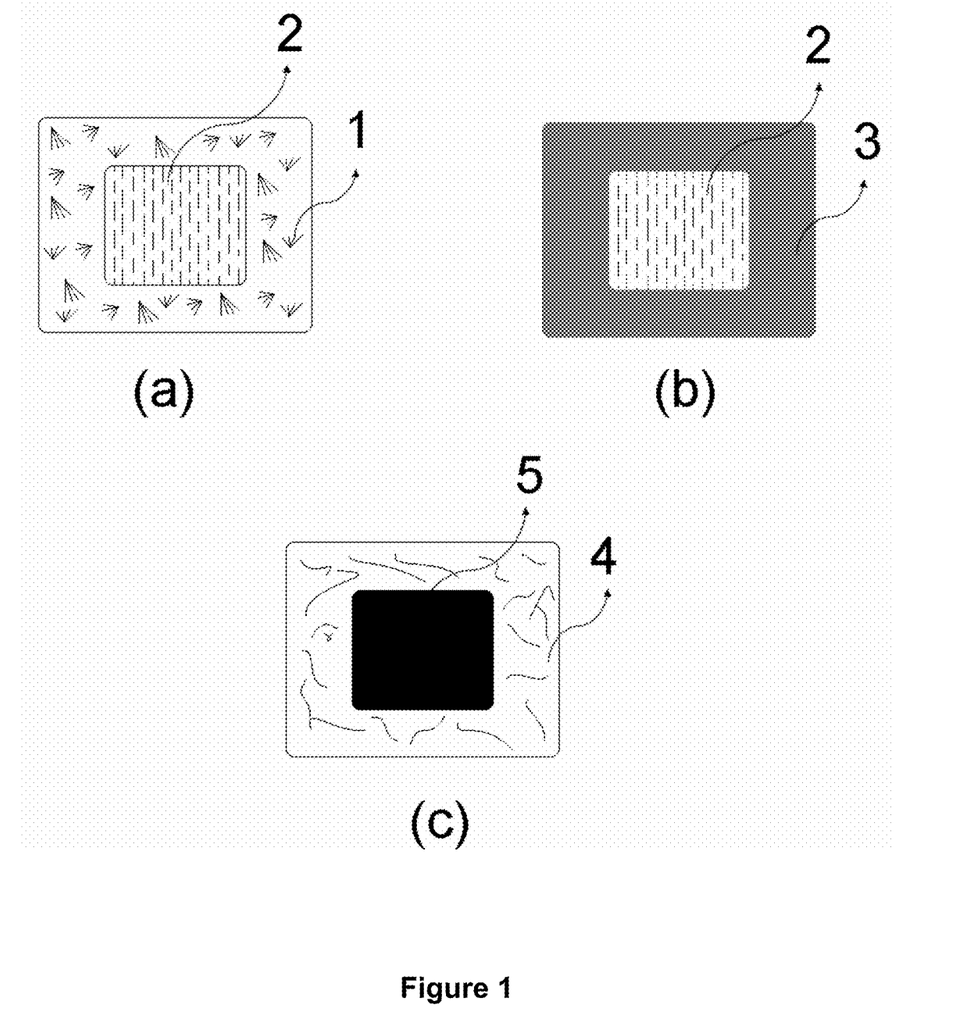
FIGS. 1a to 1c schematically show cells in the XY plane after the polymerization process of the present invention.

Referring to the accompanying drawings, in FIGS. 1a to 1c different pixels formed with the in situ electro-polymerization described are shown, which differ in the initial mesophase of the polymerizable compound. FIG. 1a shows a smectic LC at a temperature below the clearing point. The clearing point is defined as the phase transition temperature at which a LC passes from a mesophase to the isotropic state or liquid. In zone 1 the LC material exists in the smectic mesophase without alignment. Zone 2 corresponds to the electrodes where the material is oriented in a planar configuration. FIG. 1b shows the same LC at a temperature above the clearing point. In zone 3 the LC material exists in the isotropic state. Zone 2 corresponds to the same material still oriented. FIG. 1c shows a nematic LC at a temperature below the clearing point. In Zone 4 the LC material exists in a non-oriented nematic state. Zone 5 corresponds to the electrodes where the material is oriented in a homeotropic configuration.

In a typical procedure, a cell with ITO (indium tin oxide) electrodes and 6.8 microns of thickness, whose faces have been previously treated with a polyimide film, a liquid crystal polymerizable based monomer preferably on acrylate or methacrylates is introduced. The alignment of the polyimide is planar type. A direct voltage (DC) greater than or equal to 7 V/μm, for a minimum of 10 minutes and a maximum of 24 hours is applied. During this period the liquid crystalline monomer is maintained at any of its mesophases or at the isotropic phase, preferably the latter. As the polymerization progresses, the appearance of the cured system will be seen with a clearing point which will be approximately 100° C. higher than that observed for the initial monomer. This procedure results in a cell where below the electrodes the aligned material is settled and outside the electrode the original monomer remains.

Figure 2:
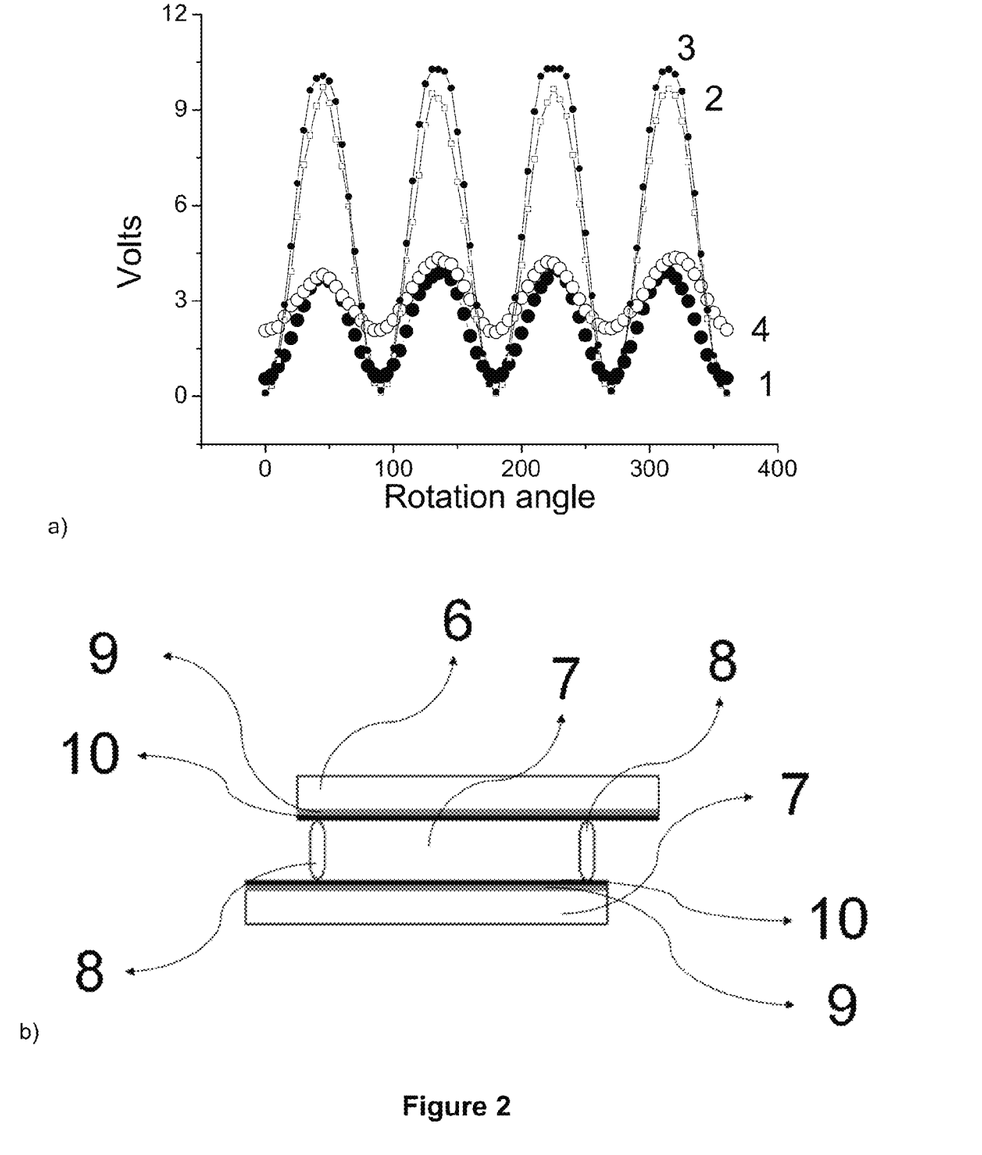
FIG. 2 shows the light transmission of the polarizer which is obtained and one of the possible schemes of the apparatus which can be manufactured using the polymerization process of the present invention.

The high degree of order of the mesophases which possess the obtained polymers, allows the development of composites with FLCs possessing chiral smectic C phases and to obtain cells with high electro-optical effect, alignment and stability (FIG. 2). FIG. 2a summarizes four different cells subjected to electro-optical measurements at different angles. The first curve corresponds to the electro-polymerized compound A6R7, as defined in the examples of this document. The second and third curves correspond to the electro-polymerized composite A6R7 and mixed with a FLC at room temperature and 70° C. The fourth curve corresponds to the pure FLC. The difference in light transmission is remarkable, especially for the A6R7-FLC mixture. FIG. 2b is a simplified diagram of the polarizer or pixel which can be made using the described polymerization, where 6 corresponds to the glass substrates, 7 is the polymerized material, 8 corresponds to spacers, 9 are the electrodes and counter electrodes, respectively, and 10 corresponds to the polymer layers considered for the alignment. These cells containing the A6R7-FLC mixture possess shorter response times and lower power consumption compared with currently systems in use based on nematic mixtures, which makes them an attractive substitute for flat screens in notebooks, televisions and desktop computers.

By using a cell with homeotropic like alignment a system where only under the electrode a material with perfect orientation was achieved. The so obtained cell is stable at room temperature and does not allow light pass through the cell between crossed polarizers, while outside the electrode only typical textures of a nematic material were observed.

Figure 3:
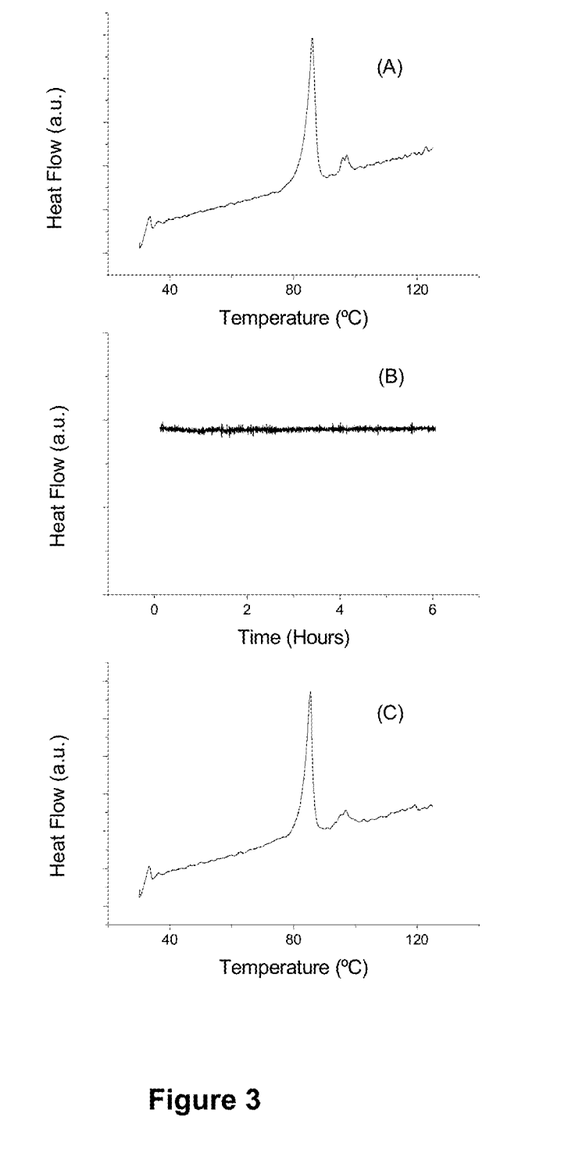
FIGS. 3a to 3c show a sequence of DSC for compound A6R7, according to the polymerization process of the present invention.

FIG. 3 allows discarding the described process as a thermal polymerization. Here we see a DSC sequence for A6R7 which is a polymerizable compound. The thermogram A corresponds to the monomer A6R7 used; isotherm B corresponds to a curing process at 120° C. for 6 hours in where monomer A6R7 remains in the isotropic state (isothermal); the thermogram C corresponds to the material obtained after this isotherm process at 120° C. The equivalence between the thermograms A and C before and after the isotherm B shows that there is no decomposition of the material nor thermal polymerization.

Figure 4:
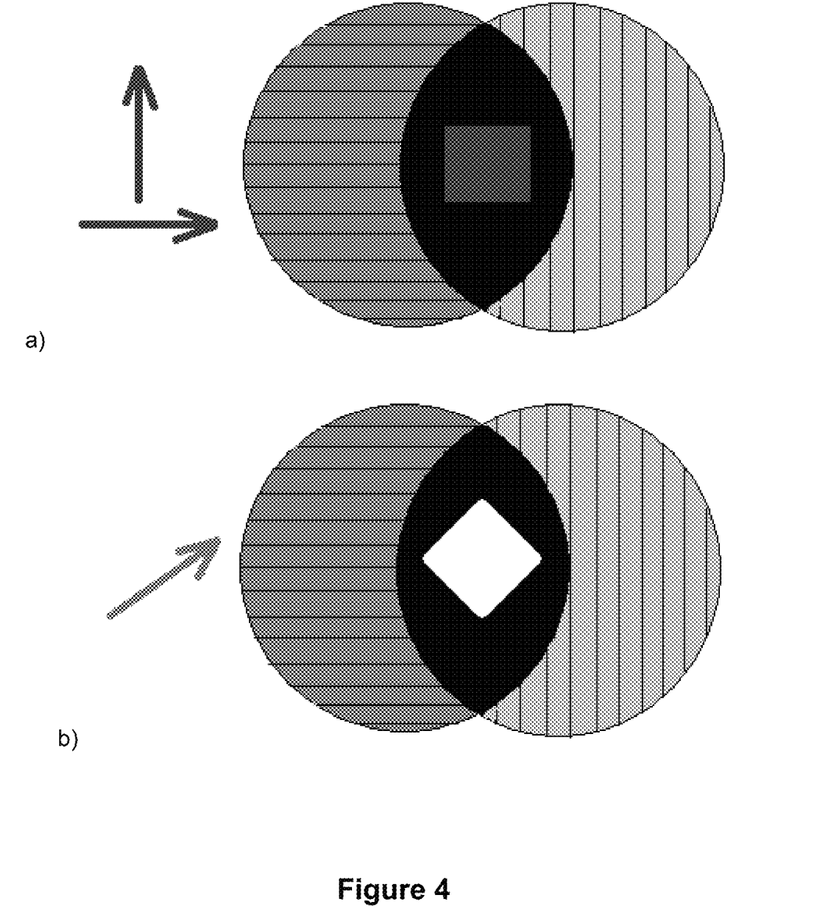
FIG. 4 corresponds to the arrangement of the polarizer, according to the present invention.

The high degree of alignment of the in situ formed polymer is seen as a homogeneous layer which acts as a light polarizer. FIG. 4 corresponds to the arrangement of the polarizer between crossed polarizers, where maximum light transmission occurs at a rotation angle of 45° (FIG. 4a), while the minimum light transmission is observed at rotation angles of 0° and 90° (FIG. 4b).

PREFERRED EMBODIMENTS OF THE INVENTION

An in situ polymerization method is protected, comprising introducing a compound having a polymerizable group, preferably an acrylate or methacrylate, in a cell formed by two glass surfaces separated by a material which acts as a spacer ranging from 1 to 100 microns, without being a limitant, which defines the thickness of the cell, where the glass surfaces have on each of their inner surfaces a thin layer of a material acting as an electrode on one side and a counter electrode on the other side, respectively, wherein said compound possesses a polymerizable group at a temperature above its melting temperature, in where through the electrode and counter electrode a direct current electric field is applied of at least 2.5 V/μm and for a period of time between 5 minutes and 24 hours until reaching the total polymerization of the compound with the polymerizable group, afterwards the cell is cooled down to room temperature and the applied field is removed.

In the in situ polymerization process preferably the compound possesses liquid crystalline properties, so the reaction can be performed either in one of the mesophases or at the isotropic state.

Preferably there is a second thin layer attached to either the electrode or the counter-electrode or both of a polymer which is treated to produce a liquid crystal alignment.

Preferably together with the polymerizable compound other non polymerizable component is added in a proportion ranging from 0.1% to 95%, which can be an organic or inorganic material or mixtures thereof.

In the event that it is an organic material, this may be a liquid crystal or a liquid crystalline mixture possessing a nematic or smectic mesophase, which may preferably have at least one chiral component.

The organic material could be a crosslinking material if necessary to prepare a film with the polymerizable compound.

In the event that the second component is an inorganic material, filler or plasticizer, it can have a nanometer or micrometer size, the latter being limited by the thickness of the cell.

In any case, the procedure is performed without the use of a chemical initiator for polymerization or the presence of solvents.

In this procedure, a polymer preferably acrylate or methacrylate type is produced, which contrary to any other polymer, has no waste or traces of polymerization initiators. This polymer eventually possesses liquid crystal properties and has optionally, if the polymerization is performed in the presence of a host, other non polymerizable component, in a proportion ranging from 0.1% to 90%.

This other component is an organic or inorganic material or mixtures thereof.

In the event of an organic material, it may be a liquid crystal or liquid crystal mixtures with a nematic or smectic mesophase, which eventually has at least one chiral component.

In the event of producing a film, obtained using a crosslinking material, part of the obtained structure will possess the crosslinking material.

The other component of the polymer may be an inorganic material, filler or a plasticizer, which can have micrometric or nanometric size.

The physical properties can be chosen between ferroelectric, magnetic, fluorescent or nonlinear optical.

This procedure is carried out in an apparatus consisting of two glass surfaces having on each of their inner surfaces a thin layer of a material acting as an electrode on one side and as a counter electrode on the other side respectively, with a second thin layer deposited either to the electrode or the counter-electrode, or both, wherein said second thin layer corresponds to a polymer which has been treated to produce the alignment of the liquid crystal or liquid crystal mixture, which is confined between the surfaces of the glass coated with the two mentioned layers, where such surfaces are also separated by a material acting as a spacer varying from 1 to 100 microns, and wherein said liquid crystal or liquid crystal mixture occupying the space left between the two treated glass surfaces and spacer is an acrylate or methacrylate type and can be subjected in this apparatus to the electropolymerization process as described above.

Between the electrodes exists a single polymeric material which can remain mixed with between 0 and 90% of a second organic or inorganic component which has not undergone decomposition or structural changes within the cell by any pretreatment.

The second component is an organic or inorganic material which alone or in a condensed state possesses ferroelectric, magnetic, fluorescent or nonlinear optical properties, which imparts to the polymer matrix.

The second organic component may be a liquid crystal, with or without a chiral center or a compound or mixture of them with a nematic or smectic mesophase.

Possible applications given to the device are as electro-optical devices, a polarizer, a pixel in a LCD or a ferroelectric sensor.

PREFERRED EXAMPLES OF THE INVENTION

The following examples, without intended to be limitant describe the scope of the invention and are based on structures as shown below.

$A = CH_3$, H n = 4, 5, 8, 11 R = OH, H X = —$CO_2$—, —C═N—, —N═N— Q = $C_1$—$C_{16}$, $OC_1$—$C_{16}$

The following table summarizes the liquid crystalline properties of the compounds considered:

| Polymerizable Compound | Transition Temp. polymerizable compound (° C.) | Electro-polymerized Polymer Temp. transition (° C.) |
|---|---|---|
| A11R6 | Cr-83.7-SmA-95.0-N-95.3-I | Cr—Sm-232-I |
| A11R6n | Cr-54.9-SmA-68.3-I | Cr—Sm-181-I |
| A4A4n | Cr-59-I I-51-N-42-Cr | Cr-59-I I-51-N-42-Cr |
| A6R7 | Cr-53.5-SmA-95.4-I | Cr—Sm-245-I |
| M11E12 | Cr-55.3-SmA-60.5-I | Cr—Sm-168-I |
| M6R14n | Cr-62.2-SmA-72.5-I | Cr—Sm-233-I |

In this table, I correspond to the isotropic state, N corresponds to the nematic mesophase, Sm corresponds to a smectic mesophase, either A (orthogonal) or C (tilted), all terms already known to those skilled in the art.

Example 1

In a commercial cell (INSTEC, Inc.) with ITO electrodes (indium oxide doped with tin) on both substrates, with a thickness of 6.8 microns and planar antiparallel alignment, a single nematic liquid crystalline monomer A4A4n is introduced into the cell by capillarity, wherein in reference to the structure when A and R are H, n is 4, X is N═N and Q is $C_4H_9$. The LC cell is introduced into a heating oven INSTEC HCS-302 to bring the LC compound above its clearing point. The cell is connected to a power supply and a DC field of 14.7 V/μm is applied for 3 hours. After the indicated time, the field is removed and the sample is cooled down below the clearing point. The remaining nematic phase is observed in the electrode area vertical aligned (without applying an electric field), while outside the area of the electrode a planar alignment is observed. The vertical alignment remains in the liquid crystalline temperature range even after crystallization and/or after heating above the clearing point of the material. The obtained cell can be used in combination with a host, to induce vertical alignment in a LC display.

Example 2

According to the procedure of Example 1, a single liquid crystalline smectic M11E12 monomer was inserted into the 6.8 microns cell by capillarity, wherein in reference to the structure when A is —$CH_3$, R is OH, n is 11, X is $CO_2$ and Q is $OC_{12}H_{25}$. The cell is heated above the clearing point of the material and connected to a power supply and a DC field of 11.7 V/μm is applied for 20 minutes. While the material is in the isotropic state the birefringent polymer formation is observed in the electrode area, which has a clearing point higher than the initial monomer and also presents a planar alignment with the formation of an aligned macro domain depending on the alignment of the cell. After the assigned time, the field is removed and the cell cooled down. While the material is in the crystalline phase, in the liquid crystalline mesophase and in the isotropic state, in the area of the electrode the presence of a polymeric material with a planar alignment and the formation of a macro domain (without applied electric field) is observed. The cell thus obtained can be used in combination with a host, to induce planar alignment for FLC displays with thicknesses ranging between 1 and 10 microns.

Example 3

According to the procedure of Example 1, a single smectic liquid crystal A6R7 was introduced into the cell, wherein in reference to the structure when A is H, R is OH, n is 6, X is CH═N, and Q is $OC_7H_{15}$. The cell is heated above the clearing point of the material and connected to a power supply and a DC field of 17.6 V/μm is applied for 20 minutes. The same alignment as described in Example 2 is observed. The cell thus obtained can be used for instance in combination with a host, to induce planar alignment in FLC displays.

Example 4

According to the procedure of Example 3 a liquid crystal mixture is inserted into the cell by capillarity, containing 20% by weight of compound A11R6n, wherein in reference to the structure when A is H, R is OH, n is 11, X is CH═N and Q is $C_6H_{13}$, and more than 80% by weight of a FLC material. The cell is heated above the clearing point of both materials and connected to a power supply and a DC field of 14.7 V/μm is applied for 20 minutes. After it, the cell is cooled down and the voltage is stopped once the temperature has reached the smectic C* phase. The same alignment as described in Example 2 is observed. The cell was characterized and compared with the same FLC material, obtaining spontaneous polarization values around 30 nC/cm2 comparable to the original FLC material (120 nC/cm2) and switching times somewhat higher, about 140 microseconds, compared to 60 µs of pure FLC.

Example 5

According to the procedure of Example 3, a liquid crystal mixture is introduced into the cell by capillarity containing 70% by weight of compound described in Example 3 A6R7 plus 30% by weight of a FLC material as described in Example 4. After 20 minutes, the cell is cooled down and the electric field is switched off once it reaches room temperature. The cell shows the same alignment as described in Example 2. The cell does not show spontaneous polarization or switching times.

Example 6

In a commercial cell with ITO electrodes on both substrates, with a thickness of 11.2 microns and homeotropic alignment a nematic liquid crystalline mixture at room temperature is introduced by capillarity, composed of 75% of a mixture possessing a nematic mesophase (Merck E48), 15% of a chiral molecule and 10% of compound M11E12 described in Example 2. The cell is subjected to the procedure described in Example 1. The material is arranged in a typical configuration of a disordered fingerprint texture of a nematic phase, while in the electrode area a vertical alignment is developed which remains without the applied electric field.

Example 7

Figure 5:
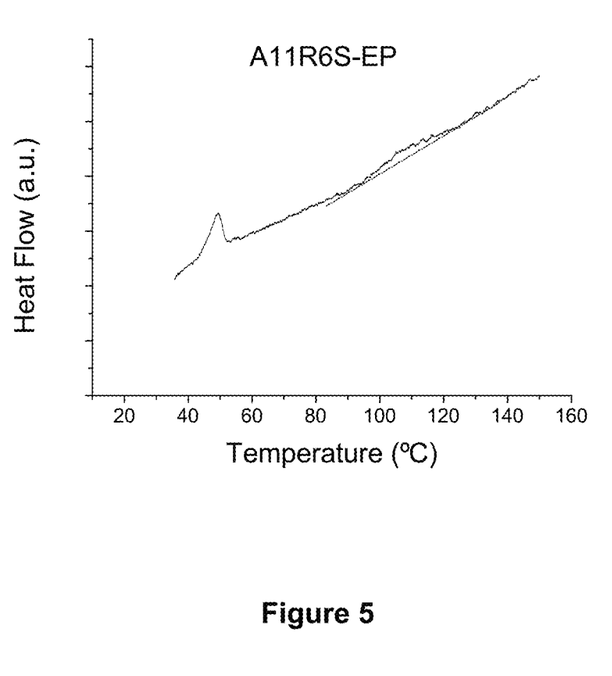
FIG. 5 corresponds to the DSC of the A11R6s polymer obtained according to the present invention.

In a cell prepared in the laboratory, consisting of two glass electrodes coated on both substrates with ITO and a thickness of 40 microns, A11R6n, a compound as described in Example 4 is introduced by capillarity. The cell is heated above the clearing point of the material, connected to a power supply and a DC field of 2.5 V/µm is applied for 24 hours. While the material is in the isotropic state, we observe the formation of polymer which does not have any kind of alignment. FIG. 5 shows the DSC of the product, which has a markedly increased clearing point, close to 150° C., compared to the original compound, which develops by heating the sequence Cr-54.9-SmA-68.3-I, detailed in the table above. In this table the isotropic transition temperature for the electro-polymerized compound (186° C.) corresponds to that obtained from commercial cells, as described in Examples 1 to 5, with alignment layers which allows obtaining a more oriented polymer and with a higher molecular weight.

All publications cited in this specification are incorporated herein by reference and are considered as being whole incorporated herein.

This invention is susceptible to a considerable variation in practice. Therefore it is not intended that the above description limits the invention to the particular embodiments presented here, neither this application should be understood as limited to the description of it.

The invention claimed is:
1. In situ polymerization process for obtaining an electro-optical apparatus consisting essentially of:
(a) introducing at least one monomer having an acrylate or methacrylate into a cell formed by two surfaces of glass separated by 1 to 100 microns by a spacer, wherein a first of the glass surfaces comprises a thin layer of a material acting as an electrode and a second of the glass surfaces comprises a thin layer of a material acting as a counter electrode,
(b) maintaining said at least one monomer at a temperature which is above its melting temperature,
(c) applying through the electrode and counter electrode a direct current electric field of at least 2.5 V/µm and for a time ranging between 5 minutes and 24 hours to polymerize the at least one monomer to form a polymer, and
(d) cooling the polymer to room temperature and removing the applied field.
2. Polymerization process according to claim 1, wherein the at least one monomer possesses liquid crystalline properties.
3. Polymerization process according to claim 2, wherein said polymerization is carried out with the at least one monomer in a mesophase or isotropic state.
4. Polymerization process according to claim 3, wherein a second thin layer comprising a treated polymer is attached to either the electrode or the counter-electrode or both to cause the polymer to be formed with a liquid crystal alignment.
5. Polymerization process according to claim 1, wherein a non-polymerizable component is introduced into the cell in step (a) along with the at least one monomer such that the non-polymerizable component is present in the cell in a proportion ranging from 0.1% to 95% w/w with respect to the at least one monomer.
6. Polymerization process according to claim 5, wherein the non-polymerizable component is an organic material.
7. Polymerization process according to claim 6, wherein the organic material is a liquid crystal or liquid crystal mixtures with a nematic mesophase.
8. Polymerization process according to claim 7, wherein the organic material is a liquid crystal or liquid crystal mixtures with at least one chiral component.
9. Polymerization process according to claim 6, wherein the organic material is a liquid crystal or liquid crystal mixtures with a smectic mesophase.
10. Polymerization process according to claim 6, wherein the organic material is a crosslinking material.
11. Polymerization process according to claim 5, wherein the non-polymerizable component is an inorganic material, wherein said inorganic material is a filler or a plasticizer.
12. Polymerization process according to claim 11, wherein the size of the inorganic material is at nanometric or micrometric scale.
13. The method according to claim 5, wherein the at least one monomer is present in the cell in an amount of greater than 10 wt %.
14. Polymerization process according to claim 1, wherein the at least one monomer is polymerized in step (c) without a chemical initiator, a solvent or electromagnetic radiation.
15. The method according to claim 1, wherein the cell does not comprise a component possessing a smectic C phase prior to application of the electric field in step (c).

* * * * *